United States Patent [19]

Enescu et al.

[11] Patent Number: 4,941,175
[45] Date of Patent: Jul. 10, 1990

[54] TAMPER-RESISTANT METHOD FOR AUTHORIZING ACCESS TO DATA BETWEEN A HOST AND A PREDETERMINED NUMBER OF ATTACHED WORKSTATIONS

[75] Inventors: Michael A. Enescu, Sunnyvale; James Lum, Redwood City, both of Calif.

[73] Assignee: International Business Machines Corporation, Armonk, N.Y.

[21] Appl. No.: 315,071

[22] Filed: Feb. 24, 1989

[51] Int. Cl.$^5$ .............................................. H04L 9/00
[52] U.S. Cl. ............................................ 380/4; 380/3; 380/23; 364/969; 364/286.5
[58] Field of Search ................ 380/3, 4, 22, 23, 49; 364/969, 969.1, 969.4, 286.5, 286.6, 252.2, 253.1, 253.2, 246.7; 340/825.31, 825.34

[56] References Cited

U.S. PATENT DOCUMENTS

| | | | |
|---|---|---|---|
| 4,218,738 | 8/1980 | Matyas et al. | 364/200 |
| 4,408,274 | 10/1983 | Wheatley et al. | 364/200 |
| 4,545,016 | 10/1985 | Berger | 364/200 |
| 4,713,753 | 12/1987 | Boebert et al. | 380/4 X |
| 4,757,533 | 7/1988 | Allen et al. | 380/23 X |
| 4,791,565 | 12/1988 | Dunham et al. | 364/200 |

*Primary Examiner*—Thomas H. Tarcza
*Assistant Examiner*—Tod R. Swann
*Attorney, Agent, or Firm*—R. Bruce Brodie

[57] ABSTRACT

A tamper-resistant method is disclosed for controlling the number of users given authorized access to licensed software in a host-based, multiple terminal system by use of an encrypted authorization list depth parameter. The method embedded in the host-licensed software can decrypt the depth parameter only using a key derived from its own CPU ID and an offset.

7 Claims, 3 Drawing Sheets

```
/*******************************************************************/
/*                      ACP - PSEUDOCODE                           */
/*                                                                 */
/* INPUT:   USERID  - STRING OF CHARACTERS DEFINING WHICH USERID   */
/*                    IS TO BE SCANNED IN THE ACCESS CONTROL       */
/*                    LIST (ACL).                                  */
/*          ENCRYPT - BOOLEAN VARIABLE (TRUE IF THE ACL HEADER     */
/*                    IS ENCRYPT, FALSE IF THE ACL HEADER IS       */
/*                    DECRYPTED).                                  */
/*          ACL     - ACCESS CONTROL LIST                          */
/*                                                                 */
/* OUTPUT:  TRUE IF USER IS AUTHORIZED                             */
/*          FALSE IF USER IS NOT AUTHORIZED                        */
/*                                                                 */
/*******************************************************************/

FUNCTION ACP(USERID: CHAR, ENCRYPT: BOOL) BOOLEAN;
                            /* DECLARE THE ACP PROGRAM             */
BEGIN
  RESET(ACL);               /* OPEN THE ACL FILE                   */
  READ(ACL,HEADER);         /* READ ENCRYPT ACL DEPTH NUMBER       */
  IF (ENCRYPT) THEN BEGIN   /* IF DEPTH NUMBER IS ENCRYPT          */
    MAX_DEPTH=DECRYPT(HEADER,GET_CPU_ID);
                            /* DECRYPT THE ACL DEPTH NUMBER        */
  END ELSE BEGIN            /* ELSE                                */
    MAX_DEPTH=HEADER;       /* THE DEPTH NUMBER IS THE HEADER      */
  END;
  I=0;                      /* INITIALIZE ACL COUNTER              */
  NOT_FOUND=TRUE;
  WHILE (I<MAX_DEPTH) AND (NOT_FOUND) DO BEGIN
                            /* SCAN THE LIST UNTIL FOUND           */
    READLN(ACL_USERID);     /* GET THE ITH ACL USERID              */
    IF (ACL_USERID=USERID) THEN BEGIN /* IF USERID IS FOUND        */
      NOT_FOUND=FALSE;      /* SIGNAL FOUND                        */
    END;
    I=I+1;                  /* ADJUST CURRENT ACL DEPTH            */
  END;
  RETURN (NOT_FOUND);       /* RETURN TRUE OR FALSE                */
END;
```

ACCESS CONTROL PROGRAM (ACP)

HOST MAINFRAME-TO-WORKSTATION DOWNLOAD SYSTEM

```
┌─ ACL-1 ─────────────────────────────────────────┐
│ -ENCRYPTED VALUE OF 3 WITH SEED=CPUID-          │
│ GEORGE      /* USER 1, E.G., W1, IN FIGURE 1 */ │
│ JOHN        /* USER 2, E.G., W2, IN FIGURE 1 */ │
│ MARY        /* USER 3, E.G., W3, IN FIGURE 1 */ │
│ ROSEALI     /* USER 4, E.G., W4, IN FIGURE 1 */ │
└─────────────────────────────────────────────────┘
```

ACCESS CONTROL LIST, EXAMPLE 1

Fig. 2

```
┌─ ACL-2 ─────────────────────────────────────────┐
│ -ENCRYPTED VALUE OF 5 WITH SEED=CPUID-          │
│ GEORGE      /* USER 1, E.G., W1, IN FIGURE 1 */ │
│ JOHN        /* USER 2, E.G., W2, IN FIGURE 1 */ │
│ MARY        /* USER 3, E.G., W3, IN FIGURE 1 */ │
│ ROSEALI     /* USER 4, E.G., W4, IN FIGURE 1 */ │
└─────────────────────────────────────────────────┘
```

ACCESS CONTROL LIST, EXAMPLE 2

Fig. 3

```
┌─ ACL-3 ─────────────────────────────────────────┐
│ 1                                               │
│ GEORGE      /* USER 1, E.G., W1, IN FIGURE 1 */ │
│ JOHN        /* USER 2, E.G., W2, IN FIGURE 1 */ │
│ MARY        /* USER 3, E.G., W3, IN FIGURE 1 */ │
│ ROSEALI     /* USER 4, E.G., W4, IN FIGURE 1 */ │
└─────────────────────────────────────────────────┘
```

ACCESS CONTROL LIST, EXAMPLE 3

Fig. 4

```
┌─ ACL-4 ──────────────────────────────────────────────────────┐
│ -ENCRYPTED VALUE OF 3 WITH SEED=A DIFFERENT CPUID THAN THE HOST- │
│ GEORGE      /* USER 1, E.G., W1, IN FIGURE 1 */              │
│ JOHN        /* USER 2, E.G., W2, IN FIGURE 1 */              │
│ MARY        /* USER 3, E.G., W3, IN FIGURE 1 */              │
│ ROSEALI     /* USER 4, E.G., W4, IN FIGURE 1 */              │
└──────────────────────────────────────────────────────────────┘
```

ACCESS CONTROL LIST, EXAMPLE 4

Fig. 5

```
/************************************************************/
/*                    ACP - PSEUDOCODE                      */
/*                                                          */
/*  INPUT:   USERID  - STRING OF CHARACTERS DEFINING WHICH USERID */
/*                     IS TO BE SCANNED IN THE ACCESS CONTROL    */
/*                     LIST (ACL).                               */
/*           ENCRYPT - BOOLEAN VARIABLE (TRUE IF THE ACL HEADER  */
/*                     IS ENCRYPT, FALSE IF THE ACL HEADER IS    */
/*                     DECRYPTED).                               */
/*           ACL     - ACCESS CONTROL LIST                       */
/*                                                          */
/*  OUTPUT:  TRUE IF USER IS AUTHORIZED                     */
/*           FALSE IF USER IS NOT AUTHORIZED                */
/*                                                          */
/************************************************************/

FUNCTION ACP(USERID: CHAR, ENCRYPT: BOOL) BOOLEAN;
                              /* DECLARE THE ACP PROGRAM     */
BEGIN
  RESET(ACL);                 /* OPEN THE ACL FILE           */
  READ(ACL,HEADER);           /* READ ENCRYPT ACL DEPTH NUMBER */
  IF (ENCRYPT) THEN BEGIN     /* IF DEPTH NUMBER IS ENCRYPT  */
     MAX_DEPTH=DECRYPT(HEADER,GET_CPU_ID);
                              /* DECRYPT THE ACL DEPTH NUMBER */
  END ELSE BEGIN              /* ELSE                        */
     MAX_DEPTH=HEADER;        /* THE DEPTH NUMBER IS THE HEADER */
  END;
  I=0;                        /* INITIALIZE ACL COUNTER      */
  NOT_FOUND=TRUE;
  WHILE (I<MAX_DEPTH) AND (NOT_FOUND) DO BEGIN
                              /* SCAN THE LIST UNTIL FOUND   */
        READLN(ACL_USERID);   /* GET THE ITH ACL USERID      */
        IF (ACL_USERID=USERID) THEN BEGIN  /* IF USERID IS FOUND */
           NOT_FOUND=FALSE;   /* SIGNAL FOUND                */
        END;
        I=I+1;                /* ADJUST CURRENT ACL DEPTH    */
  END;
  RETURN (NOT_FOUND);         /* RETURN TRUE OR FALSE        */
END;
```

ACCESS CONTROL PROGRAM (ACP)

Fig. 6

TAMPER-RESISTANT METHOD FOR AUTHORIZING ACCESS TO DATA BETWEEN A HOST AND A PREDETERMINED NUMBER OF ATTACHED WORKSTATIONS

FIELD OF THE INVENTION

This invention relates to computer system security and, more particularly, to a method for controlling the access of programs, processes, or users to resources defined by a computer system.

DESCRIPTION OF RELATED ART

Access Matrix View of Computer Resource Protection

Reference should be made to Peterson and Silberschatz, "Operating System Concepts", copyright 1983 by Addison-Wesley Publishing Co., Chapter 11, relating to protection at pp. 387–419; and Dorothy Denning, "Cryptography and Data Security", copyright 1982 by Addison-Wesley Publishing Co., Chapter 4, relating to access controls at pp. 209–230.

These references describe mechanisms for controlling the access of programs, processes, or users to resources defined by a computer system. Both Peterson and Denning apparently favor an access matrix, either statically or dynamically implemented, to be the protection construct of choice in such systems.

The matrix construct uses rows to represent domains and columns to represent objects. Each entry in the matrix consists of a set of access rights. If a computer held a global table consisting of a set of ordered triples $<U(i), O(j), R(k)>$, then whenever an operation M was executed on an object $O(j)$ by user $U(i)$, a search would be made for the triple $<U(i),O(j),R(k)>$ and the operation would be allowed to continue only upon a comparison match.

Both references further describe several constructs derived from an access matrix. These include access lists, capability lists, and lock and key mechanisms. It should be appreciated that an access list is list oriented, a capability is ticket oriented, and a lock and key combine features of both.

An access list is no more than a set of ordered pairs $<U(i), R(k)>$ sorted on each object $O(j)$. A capability list is a set of ordered pairs $<O(j), R(k)>$. The capability is a ticket authorizing any bearer (user in possession) R access rights to object O. Simple possession means that access is allowed.

In the lock and key modality, each object $O(j)$ includes a unique bit pattern denominated a "lock", while only designated ones of the users are in possession of a unique bit pattern denominated a "key". Thus, a $U(i)$ can obtain a key to $O(j)$ only if he has access rights $R(k)$ of a predetermined type.

SOME PATENTED IMPLEMENTATIONS

Dunham et al., U.S. Pat. No. 4,791,565, "Apparatus for Controlling the Use of Computer Software", issued Dec. 13, 1988, illustrates the "access control list" construct. In this case, the "access rights" are used to police license restrictions. Dunham uses an EPROM-based microprocessor as a dedicated server. In this arrangement, software usage requests, emanating from terminals and destined for a host computer, are mediated before transmission. Each request is either passed on with or without comment, or rejected, all according to criteria recited in the user software license.

Pailen et al., U.S. Pat. No. 4,652,990, "Protected Software Access Control Apparatus and Method", issued March 24, 1987, illustrates a "lock and key" approach toward limiting unpermitted copying. In Pailen, an interactive encrypted message generation process among a requesting remote terminal and a pair of mediating processors is used to comparison match user, object, and rights identity prior to granting access.

Wolfe, U.S. Pat. No. 4,796,220, "Method of Controlling the Copying of Software", issued Jan. 3, 1989, discloses another lock and key approach in which configuration information of authorized terminals is used as part of a permission code computation sent by a host to the requesting terminal. The computation is appended to each request and operates together with the configuration data as a key for recomputation of the code on subsequent access requests made by the terminal to the host.

SUMMARY OF THE INVENTION

It is accordingly an object of this invention to devise a tamper-resistant method for controlling the number of users given authorized access to licensed software in a host-based, multiple terminal system. It is a related object that the software expression of such method be embedded among the modules forming the licensed software product.

The foregoing object is satisfied by a method based on the unexpected use of an encrypted form of an authorization list depth parameter. More particularly, the object is satisfied by a method for authorizing access to data between a host and a predetermined number $N<M$ attached workstations or users. The host includes a communications server for managing physical data transmission between the host and the M workstations or users, and means for storing access control software and related information.

The first method step at the host includes invoking access control software from the storage means and invoking a precomputed list. These invocations are both in response to a service request from a workstation or user. The list includes M station or user identities and an encrypted representation of the parameter N. $N \leq M$ represents the number of workstations or users authorized access or attachment to said host.

Relatedly, the encryption key is a function of the host identity and an offset. In this regard, an "offset" is a constant that is arithmetically combined with the host identity to obscure the key. For instance, the host identity could be the host serial number hard coded in host memory, or it could be an integer value additively combined thereto.

The second method step involves ascertaining the value of depth parameter N by decrypting the representation using the key. The value N defines the depth to which the list is permitted to be searched.

The third and last step requires comparing the service requester identity to a depth N on the list and returning an authorization only upon a match condition. Significantly, any change in the search-depth N requires reencryption thereof.

Advantageously, any host-resident licensed software product, a portion of which being downloadable to accessing terminals, embodying the method of this invention requires only a single installation step, in addition to regulating the number of authorized users. It even permits dynamic authorization of users to a single machine since the encryption key is a function of the host identity. Note that the use of the host identity limits the use of the code to a predetermined system.

BRIEF DESCRIPTION OF THE DRAWING

FIGS. 2–5 set out access control list examples 1–4 according to the invention.

FIG. 6 shows a pseudocode flow of control of the method of the invention.

DESCRIPTION OF THE PREFERRED EMBODIMENT

Figure 1:
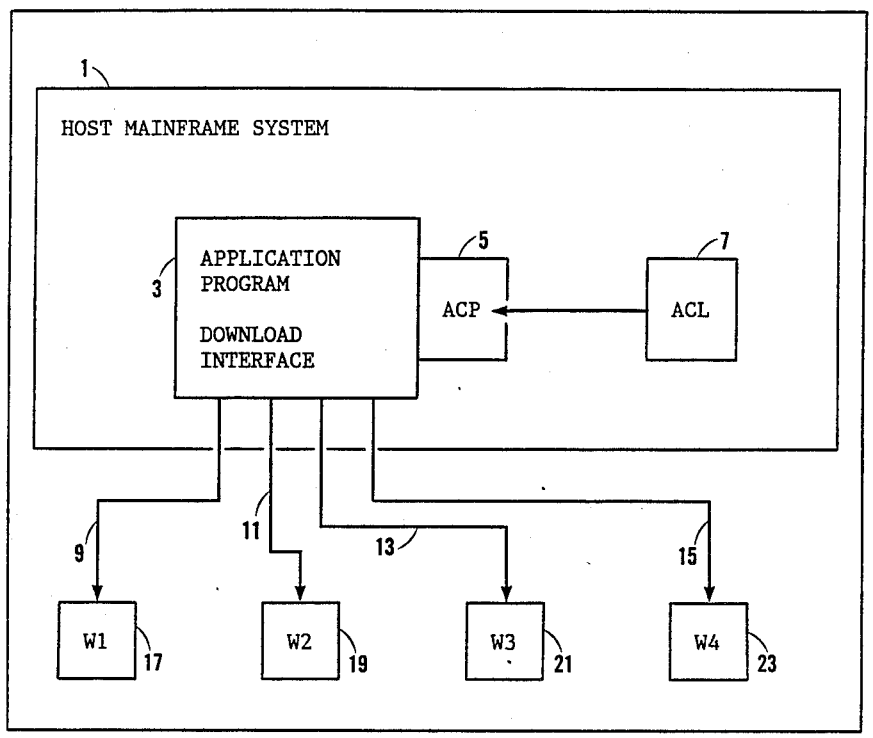
FIG. 1 depicts a host CPU-to-workstation download system.

Referring now to FIG. 1, there is shown a CPU 1 and a plurality of terminals 17, 19, 21, 23 coupled thereto over paths 9, 11, 13, 15. In the subsequent description, it shall be assumed that the CPU node runs under an operating system that uses a communications server similar to the system described in either "VM/System Product Programmer's Guide to the Server-Requester Programming Interface for VM/System Product" (pp. 6–7), IBM publication SC24-5291-1, Dec. 1986; or "TSO Extensions Programmer's Guide to the Server-Requester Programming Interface for MVS/XA" (pp. 1–3), IBM publication SC28-1309-1, Sept. 1987.

Other computing facility resources are governed by the IBM/370 Principles of Operation as described in Amdahl et al., U.S. Pat. No. 3,400,371, "Data Processing System", issued Sept. 3, 1968.

Referring again to FIG. 1, in addition to a usual complement of operating system services, CPU 1 preferably includes at least one application executable in a communicating relation with at least one terminal over a download interface to an accessing workstation over a designated path. It should be appreciated that licensed software products are expressed in object code only (OCO) form. They are packaged according to a structured program syntax frequently including a plurality of single entrance/single exit modules (see J. E. Nicholls, "The Structure and Design of Programming Languages", The Systems Programming Series, copyright 1975 by Addison-Wesley Publishing Co., Chapter 12, relating to modular programming, especially at page 486). Accordingly, in the preferred embodiment, an access control program (ACP) and an access control list (ACL) are embedded among the product modules. Both the OCO product form and dispersal of the ACP and ACL among several modules should render them relatively immune from isolation and casual inspection.

ACCESS CONTROL LIST

The ACL preferably comprises a file containing a header record followed by one record per authorized user. The header record will characterize the number of authorized users in the list. For instance, if the header records include an encrypted integer value of three, then only the first three users in the ACL will be authorized to invoke the download transfer operation.

To authorize a user, access must be made to the data set (module) containing the ACL residing in the host CPU 1. At this point, a new authorized ID may be entered consonant with the depth prescribed by the header record. Note that the data set may be protected additionally as described in IBM's Resource Control Facility (RACF) set forth in "OS/VS2 MVS RACF Command Language Reference", IBM publication SC28-0733.

Referring now to FIGS. 2–5, there are shown access control list examples 1–4 according to the invention. FIG. 2 lists four names with a parameter depth of N=3. Thus, only the terminal or user identities GEORGE, JOHN, and MARY are authorized, while ROSEALI is not. In FIG. 3, the permitted depth exceeds the length of the list so that another identity could be added. FIG. 4 shows a depth of 1, while FIG. 5 shows a list with a different CPUID. In the latter regard, the depth parameter would not be decrypted since the key is a function of a predetermined CPUID + offset.

As a practical matter, whether the host CPU is local area network or VM attached to terminals, authorization and access mechanisms rely principally upon a password match. In the event of mismatch or a repeated pattern of mismatch, entry is merely denied. In other systems, such as the previously mentioned RACF, other criteria such as location or a value of a system clock may be used to control access.

ACCESS CONTROL PROGRAM (ACP)

Referring now to FIG. 6, there is shown a pseudocode sequence whose execution embodies the method of the invention. The sequence is illustratively expressed in a PASCAL strongly-typed source language. Significantly, the ACP may be called either once per logged-on session or more than once (e.g., every time a data transfer is intended to be performed).

The code specifies the following functions including:

(a) Opening the file containing the ACL.

(b) Reading the header record and decoding the depth level N. This is implemented by decrypting the header with a key formed from the CPUID + offset according to any well-known encryption/decryption algorithm. Such algorithms are to be found in Ehrsam et al., U.S. Pat. No. 4,227,253, "Cryptographic Communication Security for Multiple Domain Networks", issued Oct. 7, 1980; Matyas et al., U.S. Pat. No. 4,218,738, "Method for Authenticating the Identity of a User of an Information System", issued Aug. 19, 1980; and Meyer and Matyas, "Cryptography — New Dimension in Computer Data Security", copyright 1982 by John Wiley & Sons.

(c) Scanning the ACL to find a match between the requester ID and the list within the decrypted depth range N.

(d) If the match is successful, then invoke the authorized application on the host. Otherwise, return a message to the requesting workstation indicating UNAUTHORIZED.

It should be noted from the code recited in FIG. 6 that the two critical structures are the IF..THEN..ELSE conditional statement for ascertaining the depth parameter, followed by the WHILE..DO loop for scanning the ACL for a match condition.

In considering this invention, it should be remembered that the present disclosure is illustrative only and the scope of the invention should be determined by the appended

We claim:

1. A method for authorizing access to application software resident in a CPU host from among $N < M$ workstations or users communicatively attaching said CPU host, said CPU manifesting indicia of identity, comprising the steps of:

(a) forming a list of authorized users and encrypting thereon a depth parameter N, said encryption using a function of the CPU identity and an offset as a key;

(b) responsive to each application software access request from among the workstations or users, accessing the list and decrypting the depth parameter N with the key; and (c) scanning the list within the depth N and returning an access authorization to the requester only upon an identity 2. The method according to claim 1, wherein the access authorization is of the form of invocation of the application software, and the refusal of the access request is of the form of a message sent to the requesting workstation or user.

3. The method according to claim 1, wherein the arrangement of the CPU host communicatively attaching the workstations or users is selected from the set consisting of a local area network and a multiprogramming, multiprocessing system exemplified by VM.

4. The method according to claim 1, wherein the method steps further include modifying the search depth N only by reencrypting same.

5. The method according to claim 1, wherein the list and the access control software embodying the method are embedded within an object-coded version of the application.

6. A tamper resistant method for authorizing access to data between a host and a predetermined number N < M attached work stations or users, said host including a communications server for managing physical data transmission between the host and M work stations or users; and means for storing access control software and related information; said host manifesting indicia of identity, comprising the steps at the host of:

(a) responsive to a service request from a work station or user, invoking access control software from said storage means and a pre-computed list, said list includes M station or user identities and an encrypted representation of N indicative of the number of work stations or users authorized access or attachment to said host, said encrypted representation N being formed using an encryption key as a function of the host identity and an offset;

(b) ascertaining the depth N to which the list may be searched by decrypting the representation using the key; and (c) comparing identity of the work station or user originating the service request with the identities of the M stations or users on the list but only to a depth N, and, returning an authorization only upon a match condition.

7. The method according to claim 6, wherein the method steps further include modifying the search depth N only by reencrypting same.

* * * * *

UNITED STATES PATENT AND TRADEMARK OFFICE
CERTIFICATE OF CORRECTION

PATENT NO. : 4,941,175

DATED : July 10, 1990

INVENTOR(S) : M. A. Enescu, et al.

It is certified that error appears in the above-identified patent and that said Letters Patent is hereby corrected as shown below:

CLAIM 1, Column 5, Line 9, after "identity", insert --match.--

Signed and Sealed this

Sixth Day of April, 1993

Attest:

STEPHEN G. KUNIN

Attesting Officer

Acting Commissioner of Patents and Trademarks